US008855468B2

(12) United States Patent
Zetterower et al.

(10) Patent No.: US 8,855,468 B2
(45) Date of Patent: Oct. 7, 2014

(54) VIDEO STREAM INDEX GENERATION AT A VIDEO CONTENT TRANSMITTER

(75) Inventors: Charlie William Zetterower, Parker, CO (US); David A. Kummer, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 305 days.

(21) Appl. No.: 13/487,101

(22) Filed: Jun. 1, 2012

(65) Prior Publication Data
US 2012/0301108 A1 Nov. 29, 2012

Related U.S. Application Data

(63) Continuation of application No. 12/424,399, filed on Apr. 15, 2009, now abandoned.

(51) Int. Cl.
| | |
|---|---|
| *H04N 9/80* | (2006.01) |
| *H04N 21/432* | (2011.01) |
| *H04N 21/4147* | (2011.01) |
| *H04N 5/782* | (2006.01) |
| *H04N 21/845* | (2011.01) |
| *H04N 21/435* | (2011.01) |
| *H04N 21/235* | (2011.01) |

(52) U.S. Cl.
CPC .......... *H04N 21/435* (2013.01); *H04N 21/4325* (2013.01); *H04N 21/4147* (2013.01); *H04N 5/782* (2013.01); *H04N 21/8455* (2013.01); *H04N 21/235* (2013.01)
USPC ........................................................ 386/241

(58) Field of Classification Search
CPC ..... H04N 5/782; H04N 5/783; H04N 21/235; H04N 21/23608; H04N 21/8455; H04N 21/4325; H04N 21/435; H04N 21/4147; G11B 27/005; G11B 27/10
USPC .................................................. 386/343–352
See application file for complete search history.

(56) References Cited

U.S. PATENT DOCUMENTS

| | | | |
|---|---|---|---|
| 5,594,490 A | 1/1997 | Dawson et al. | |
| 5,864,682 A * | 1/1999 | Porter et al. | 709/247 |

(Continued)

FOREIGN PATENT DOCUMENTS

EP   1 286 351 A2   2/2003

OTHER PUBLICATIONS

Notification of Transmittal of the International Search report and the Written Opinion of the International Searching Authority, or the Declaration, from the European Patent Office, for PCT/US2010/030902, mailed Jun. 16, 2010, 10 pages.

*Primary Examiner* — Thai Tran
*Assistant Examiner* — Stephen Smith
(74) *Attorney, Agent, or Firm* — Seed IP Law Group PLLC

(57) ABSTRACT

A method of generating and using indexing information for video content is presented. In the method, an index stream for a video stream is generated at a video content transmitter. The video stream includes video frames, and the index stream includes an index for each of at least some of the video frames within the video stream. The video stream and the index stream are transmitted from the video content transmitter to a video content receiver, which receives and stores the video and index streams. Further, at the video content receiver, the index stream is processed to locate the video frames within the video stream that are associated with at least some of the indexes of the index stream, and at least some of the located video frames of the video stream are presented to an output device under control of a user of the video content receiver.

20 Claims, 11 Drawing Sheets

(56) References Cited

U.S. PATENT DOCUMENTS

| | | | |
|---|---|---|---|
| 5,949,948 A * | 9/1999 | Krause et al. | 386/350 |
| 6,850,284 B2 | 2/2005 | Gries et al. | |
| 6,876,705 B2 | 4/2005 | Katsavounidis et al. | |
| 7,093,277 B2 | 8/2006 | Perlman | |
| 7,106,749 B1 * | 9/2006 | Darshan et al. | 370/395.64 |
| 7,522,816 B2 | 4/2009 | Bullwinkle et al. | |
| 2002/0184637 A1 * | 12/2002 | Perlman | 725/87 |
| 2007/0050837 A1 * | 3/2007 | Lopez-Estrada | 725/138 |
| 2007/0300249 A1 | 12/2007 | Smith et al. | |
| 2008/0056682 A1 * | 3/2008 | Minnick et al. | 386/112 |
| 2009/0037965 A1 | 2/2009 | Tsai | |
| 2009/0256718 A1 * | 10/2009 | Lockett et al. | 340/825.24 |
| 2009/0257729 A1 * | 10/2009 | Ahn | 386/46 |
| 2010/0195974 A1 | 8/2010 | Zheng et al. | |
| 2011/0035034 A1 * | 2/2011 | Gupta et al. | 700/94 |

* cited by examiner

VIDEO STREAM INDEX GENERATION AT A VIDEO CONTENT TRANSMITTER

BACKGROUND

A popular and effective way of accessing television programming is via a satellite or cable television broadcast receiver or "set-top box" designed to receive television video and audio data from an orbiting satellite or a cable television headend. By employing such a set-top box, a subscriber to a satellite or cable television service provider may receive any of several hundred programming channels providing news, sports, entertainment, and the like for live program viewing. In addition, the set-top box may include a digital video recorder (DVR) for recording programs for subsequent playback at a time more convenient for the subscriber. A DVR often incorporates a magnetic disk drive or similar data storage technology for storing the recorded programs.

Incorporating a DVR in a set-top box provides the further advantage of allowing the subscriber to implement "trick modes", which are video playback modes other than the familiar normal-speed, forward playback mode. Trick modes may include forward and reverse scanning of video at faster-than-normal speeds, forward and reverse slow-motion playback, forward and reverse frame-by-frame review, and pause, each of which is controlled by the subscriber, typically by way of a remote control device. Further, as a set-top box DVR normally records programs specifically indicated by the subscriber for later viewing, as well as programs currently being delivered or broadcast to the set-top box, the subscriber may use the trick modes on essentially any program being viewed.

To implement the forward and reverse fast-scanning modes, the DVR is often designed to display to the subscriber disjoint frames of the video program, each for a short period of time in rapid succession, so that the subscriber or user may discern the progress of the scan. To that end, the DVR or associated set-top box may generate indexing information indicating various access points into the video program being viewed at which complete video frames may be retrieved. Such information is often necessary, as video programs are typically encoded in a compressed format in which many of the video frames are encoded presuming known information about the previous or subsequent frame. Such "predicted" frames are thus typically poor candidates for presentation during a fast-scanning trick mode due to the lack of complete information being provided for that frame. At least some of the other trick modes may benefit from the use of this indexing information as well.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
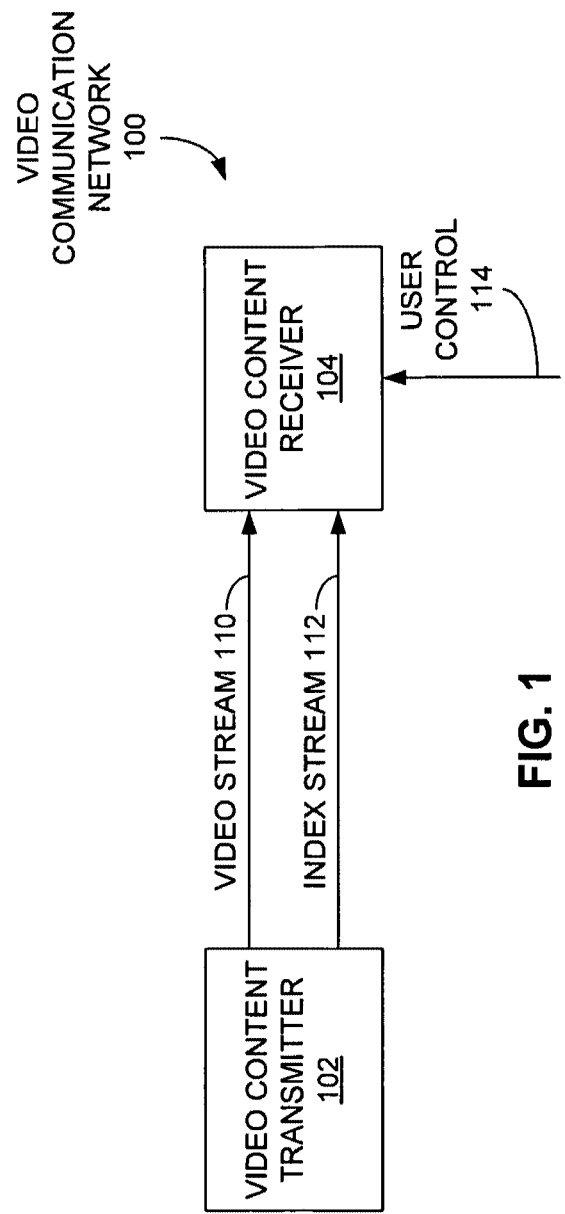
FIG. 1 is a simplified block diagram of a video communication network according to an embodiment of the invention.

FIG. 1 is a simplified block diagram of a video communication network 100 according to an embodiment of the invention. The video communication network 100 includes a video content transmitter 102 and a video content receiver 104. In one embodiment, the video communication network 100 may be a satellite television broadcast network, with the video content transmitter 102 existing as part of a satellite uplink center incorporating a satellite headend, and the video content receiver 104 being embodied as a satellite television receiver or set-top box. In another example, the video communication network 100 may be a cable television broadcast network, with the video content transmitter 102 incorporated in a cable headend, while the video content receiver 104 is a cable television receiver or set-top box. Other video communication networks, such as terrestrial (over-the-air) television broadcast networks, computer networks (such as the Internet), or any other wired or wireless communication network, may serve as the video communication network 100 of FIG. 1.

Further, while FIG. 1 indicates that the video content transmitter 102 is in direct communication with the video content receiver 104, other intermediate devices, such as routers, repeaters, splitters, and other communication circuitry, may help form the communication path between the transmitter 102 and the receiver 104 while remaining with the scope of the invention. For example, in the case of a satellite television broadcast network, the communication path from the video content transmitter 102 to the video content receiver 104 may include an orbiting satellite employing a number of transponders for receiving data from the video content transmitter 102 and relaying that data to the video content receiver 104, as well as other video content receivers not depicted in FIG. 1.

Figure 2:
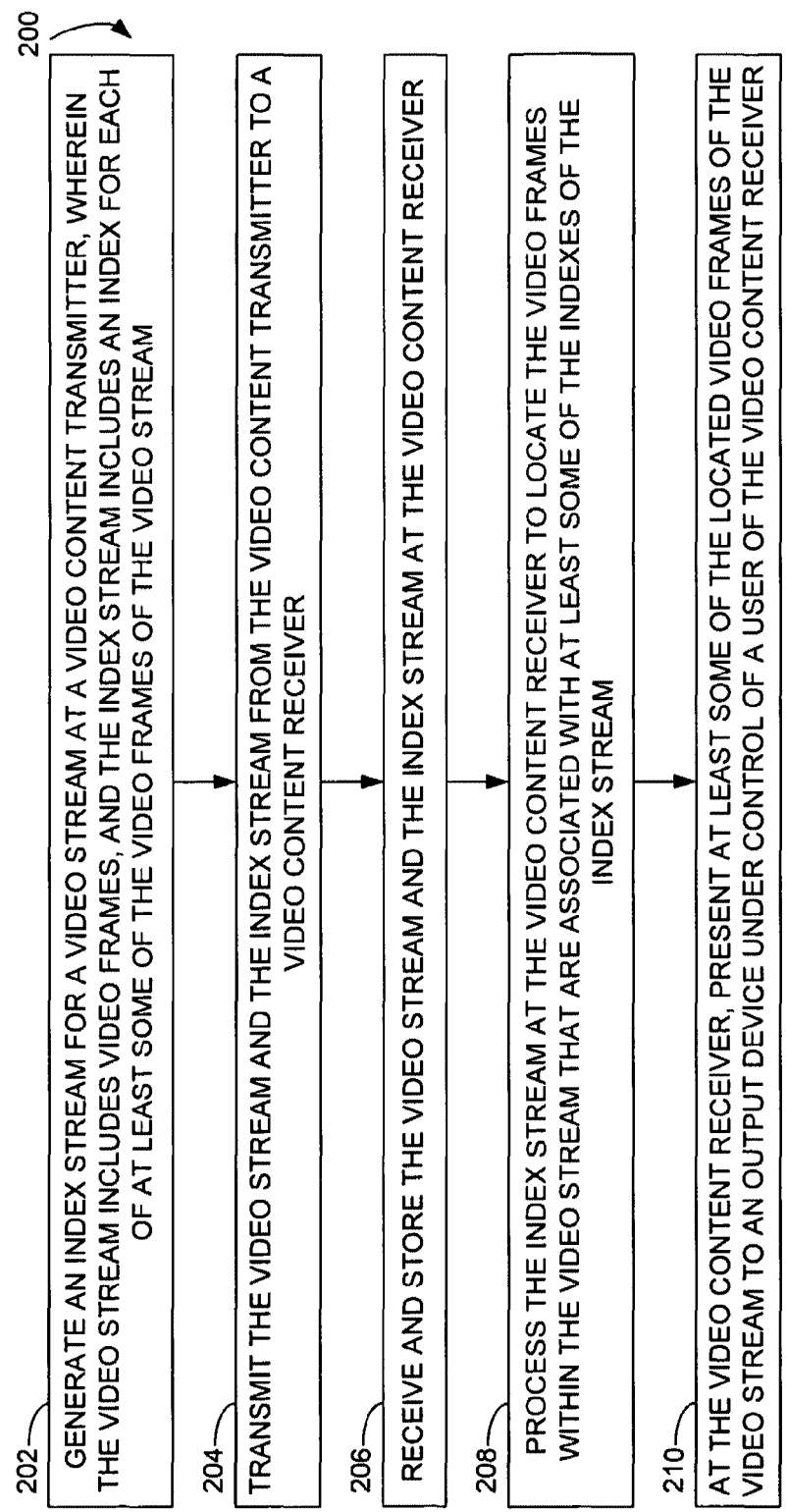
FIG. 2 is a flow diagram of a method according to an embodiment of the invention for generating and using indexing information for video content in the video communication system of FIG. 1.

FIG. 2 presents a flow diagram of a method 200 of generating and using indexing information for video content in the video communication network 100 of FIG. 1 according to an embodiment of the invention. However, other video communication systems other than the specific system 100 of FIG. 1 may employ the method 200 of FIG. 2 to similar effect.

In the method 200, an index stream 112 for a video stream 110 is generated at the video content transmitter 102 (operation 202). The video stream 110 includes video frames. For example, a video frame is data representing one still video image of a video presentation, such as a movie, sports presentation, or other program. The index stream 112 includes an index for each of at least some of the video frames within the video stream 110. The video stream 110 and the index stream 112 are both transmitted from the video content transmitter 102 to the video content receiver 104 (operation 204).

After receiving and storing the video stream 110 and the index stream 112 (operation 206), the video content receiver 104 processes the index stream 112 to locate the video frames within the video stream 110 that are associated with at least some of the indexes of the index stream 112 (operation 208). At the video content receiver 104, at least some of the located video frames of the video stream 110 are presented to an output device (not shown in FIG. 1) under control 114 of a user of the video content receiver 104 (operation 210).

While the operations of FIG. 2 are depicted as being executed in a serial fashion, other orders of execution, including concurrent execution of two or more operations, are also possible. For example, the operations 202, 204 associated with the transmitter 102 may proceed concurrently with each other, as well as with the operations 206-210 associated with the receiver 104. Similarly, any of the operations 206-210 of the receiver 104 may be executed concurrently. Also, either or both of the video stream 110 and the index stream 112 maybe partially or completely stored prior to the index stream 112 is being processed and used to present video frames to the output device independently of the receiving and storing process. In another embodiment, a computer-readable storage medium may have encoded thereon instructions for a processor or other control circuitry to direct the video content transmitter 102 and/or the video content receiver 104 to implement the method 200.

As a result, the video content transmitter 102, which is normally supplied or operated by a video service provider, such as a satellite or cable broadcast television service provider, assumes the responsibility of generating indexing data for its audio/video programs to allow the use of at least some playback trick modes, thus relieving the video content receiver 104 of this duty. Therefore, processing power within the video content receiver 104 may be conserved for other tasks, such as responding to user trick mode commands. Other advantages may be recognized from the various implementations of the invention discussed in greater detail below.

Figure 3:
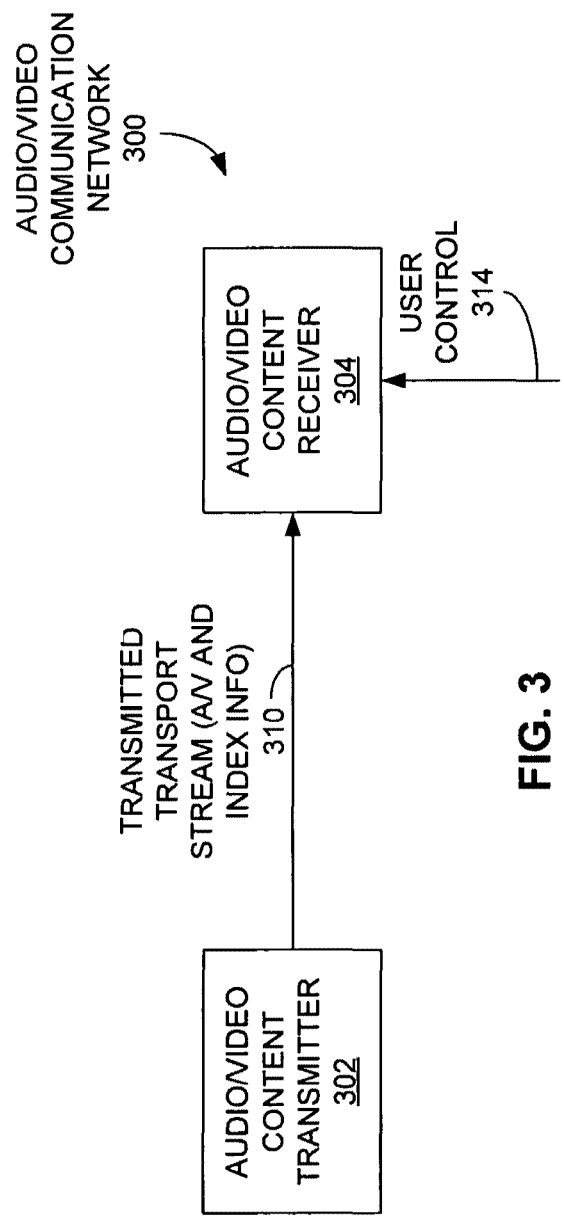
FIG. 3 is a block diagram of an audio/video communication network according to an embodiment of the invention.

FIG. 3 is a block diagram of an audio/video communication network 300 according to another embodiment of the invention. The network 300 includes an audio/video content transmitter 302 and an audio/video content receiver 304. As with the video communication network 100 of FIG. 1, the network 300 of FIG. 3 may be a satellite or cable television broadcast network, or any other type of communication network capable of transmitting video data and related indexing data from the transmitter 302 to the receiver 304. Further, while only one transmitter 302 and receiver 304 are shown, other implementations may employ multiple transmitters 302 and receivers 304 within the network 300.

As shown in FIG. 3, the audio/video content transmitter 302 generates and transmits a transport data stream 310 including audio and video streams, along with an index stream and possibly other metadata associated with the audio and video streams. An example of such a data stream is a transport stream (TS) associated with one of the Motion Picture Experts Group (MPEG) audio/video data formats, such as MPEG-2 or MPEG-4, although other data stream formats may be utilized in other implementations. Each of the audio, video, index, and other metadata streams may be associated with a particular audio/video service, such as a specific television channel or network. Further, the transmitted transport stream 310 may include audio, video, index, and other streams associated with other audio/video services as well.

The audio/video content receiver 304 of FIG. 3 receives the transmitted transport stream 310, and then processes the included index stream to locate various video frames within an associated video stream carried in the transmitted transport stream 310. At least some of the located video frames are then presented under user control 314 of the receiver 304, which may include the use of the video trick modes discussed above. Each facet of the generation and use of the index stream in associated with the video stream is described in greater detail hereinafter.

Figure 4:
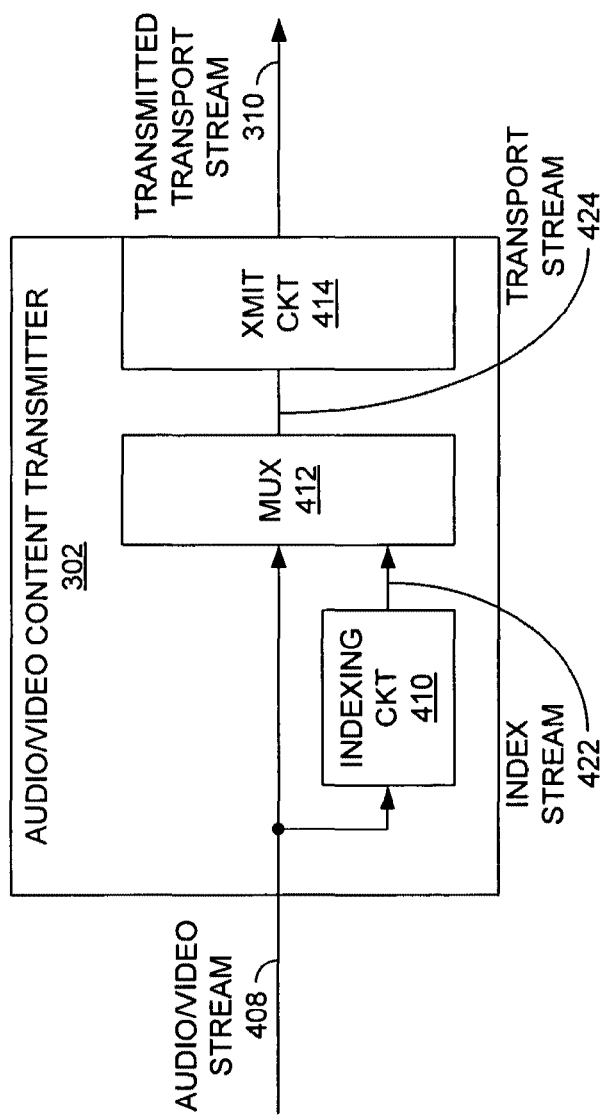
FIG. 4 is a block diagram of an audio/video content transmitter of FIG. 3 according to an embodiment of the invention.

FIG. 4 illustrates the audio/video content transmitter 302 of FIG. 3 according to one implementation. The audio/video content transmitter 302 includes an indexing circuit 410, a multiplexer 412, and a transmitter circuit 414. Other components for performing other functions within the transmitter 302 not specifically described herein may also be included in other examples.

As shown in FIG. 4, the indexing circuit 410 receives an audio/video stream 408 as input. In one embodiment, the audio/video stream 408 may be MPEG-2 or MPEG-4 audio/video data formatted in an MPEG-TS (transport stream) format, an MPEG-PS (program stream) format, or other data formatting means. Further, the audio/video stream 408 may be delivered to the audio/video content transmitter 302 over an Internet Protocol (IP) connection, an Asynchronous Serial Interface (ASI) connection, or other connection capable of carrying the audio/video stream 408. As depicted in FIG. 4, the audio/video stream 408 is received from an external source, such as an audio/video programming network, and supplied directly to the indexing circuit 410. In another example, the audio/video stream 408 may be decoded, altered, and re-encoded prior to being presented to the indexing circuit 410. Alternatively, the audio/video stream 408 may be generated within the audio/video content transmitter 302.

Additionally, the audio/video stream 408 may include audio and video streams for multiple audio/video services, such as multiple television stations or programming outlets. In the case of a satellite broadcast network, an audio/video stream 408 carrying multiple services ultimately may be transmitted from the audio/video content transmitter 302 to the audio/video content receiver 304 by way of a single transponder of an orbiting satellite.

The indexing circuit 410 processes the incoming audio/video data stream 408 to generate an index stream 422 describing the audio/video data stream 408. More specifically, the index stream 422 includes a number of indexes, each of which describes the location of a separate video frame within the audio/video data stream 408. Each index may describe either or both of an absolute location of the associated video frame within the audio/video stream 408, and a relative location of the associated video frame compared to another indexed video frame of the stream 408. This location information may be presented by way of a timestamp, an amount of data, or some other format. In one example, the index stream 422 is generated in a format compatible with the audio/video stream 408, such as an MPEG-2 or MPEG-4 format stream. A specific example of an index and related data is discussed further below in conjunction with FIGS. 8A-8C.

The indexing circuit 410 may be implemented in a number of ways. For example, the indexing circuit 410 may be a hardware circuit embodied in one or more application-specific integrated circuits (ASICs) or other types of logic circuitry. In another implementation, the indexing circuit 410 may be a more general-purpose computer processing system programmed with software configured to perform the indexing task. A combination of specialized hardware and general-purpose algorithmic processing circuitry, such as a microprocessor, microcontroller, digital signal processor (DSP) or the like, driven by software configured to implement the indexing process, may serve as another indexing circuit 410 arrangement. Further, the indexing circuit 410 may represent its own circuit, or may be included in within circuitry performing other functions, such as MPEG compression.

As the audio/video stream 408 may contain streams for multiple audio/video services, as mentioned above, the indexing circuit 410 may be configured to detect the various services and generate a separate index stream 422 for each service. In another example, multiple indexing circuits 410 may be employed, one for each of the separate audio/video services represented in the audio/video stream 408. Furthermore, one or more additional indexing circuits 410 may be utilized as redundant circuits to be employed in the event a primary indexing circuit 410 becomes inoperative.

The indexing circuit 410 may be configured to selectively generate portions of an audio/video stream 408 at one time or another based upon a received command from an operator or other person or system associated with the audio/video content transmitter 302. The indexing circuit 410 may also be programmed or commanded to generate index data for only select audio/video services represented in the audio/video stream 408. Other options regarding the generation of indexing information for at least some portion of the received audio/video stream 408 may be provided in further implementations.

As the indexing circuit 410 generates the index stream 422, the multiplexer 412 combines the index stream 422 and associated audio/video stream 408 into a single audio/video transport stream 424, such as an MPEG-TS or MPEG-PS stream, as mentioned earlier. In this environment, the index stream 422 and the audio/video stream 408 are multiplexed by way of time-division multiplexing (TDM) of packets of both streams 408, 422. However, under other transport stream formats, different types of multiplexing may be employed to combine the streams 408, 422. The multiplexer 412 may also generate and insert any formatting consistent with the transport stream 424 format. In addition, the multiplexer 412 may perform any other processing required of the transport stream 424 or the individual streams 408, 422, such as data scrambling to prevent unauthorized access to the streams 408, 422. The resulting transport stream 424 then may be carried over an IP connection, ASI connection, or other suitable connection to the transmitter circuit 414.

The transmitter circuit 414 receives the transport stream 424 and transmits the transport stream 424 according to a format or technology commensurate with the network 300 in which the audio/video content transmitter 302 operates, resulting in the transmitted transport stream 310. For example, in a satellite television broadcast network, the transmitter circuit 414 generates and amplifies a signal of a particular frequency carrying the transport stream 424 which may be forwarded to an uplink antenna for transmission to a particular satellite transponder. Other types of audio/video communication networks, such as cable television networks, may employ modulation, amplification, and other signal conditioning techniques appropriate for that type of network.

Figure 5:
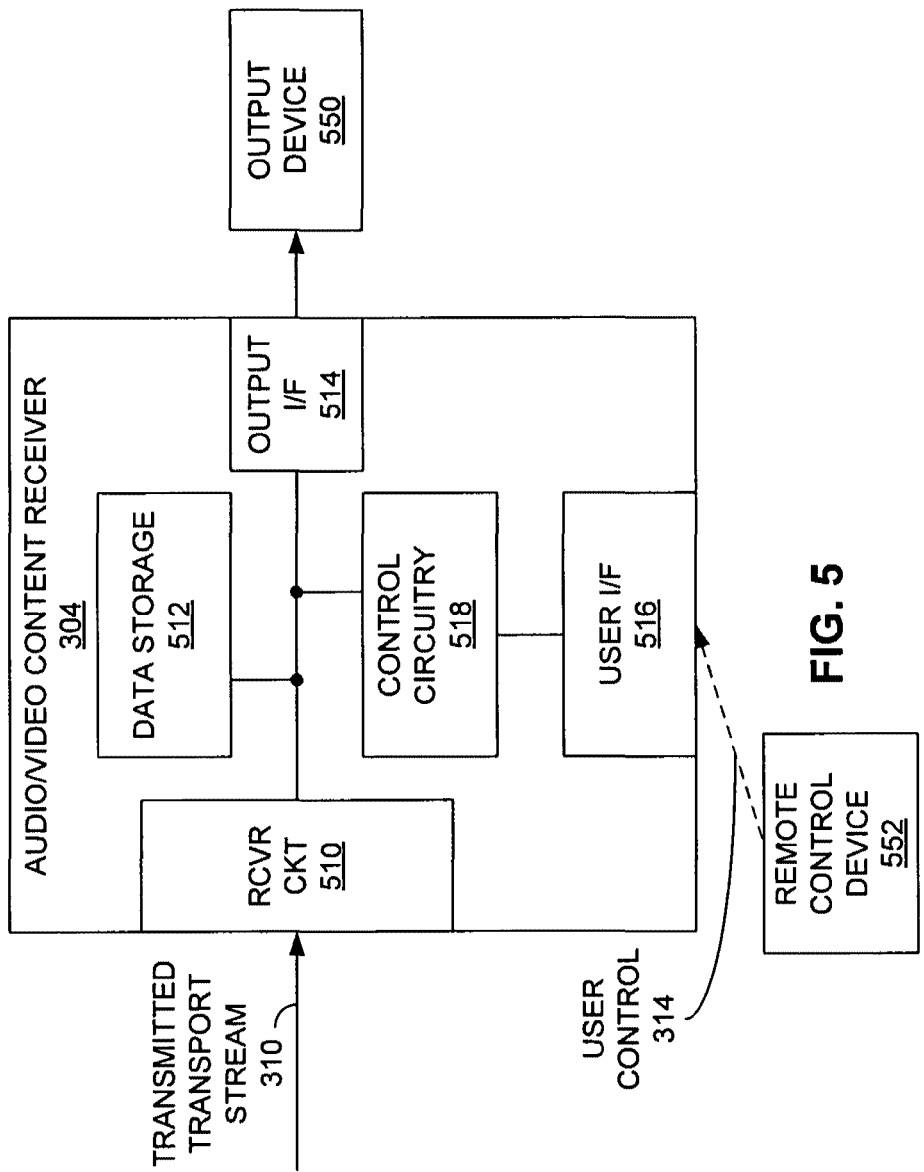
FIG. 5 is a block diagram of an audio/video content receiver of FIG. 3 according to an embodiment of the invention.

The audio/video content receiver 304, an example of which is depicted in FIG. 5, receives the transmitted transport stream 310 transmitted from the audio/video content transmitter 302. The audio/video content receiver 304 includes a receiver circuit 510, data storage 512, an output interface 514, a user interface 516, and control circuitry 518. Other components not explicitly depicted in FIG. 5 may also be included in other versions of the receiver 304, but are not discussed herein to focus on the components most closely involved with the inventive concepts discussed below.

The receiver circuit 510 is configured to receive the transmitted transport stream 310 from the audio/video content transmitter 302 and convert the stream 310 to a form more usable for processing within the audio/video content receiver 304. Such conversion may include frequency down-conversion, amplification, reformatting, and other functions. In the case of a satellite audio/video communication network, the receiver circuit 510 may be coupled with or include a hyperboloid antenna combined with a low-noise block-converter/feedhorn (LNBF), which collects and amplifies the incoming signals carrying the transmitted transport stream 302, and down-converts the signals from microwave frequencies to intermediate frequencies. Concurrently, the receiver circuit 510 may also receive and process other transport streams not specifically indicated in FIG. 5 from other satellite transponders in the same manner. As presented in FIG. 5, the receiver circuit 510 may also include tuner circuitry for selecting one or more of the audio/video data services being carried by the transmitted transport stream 310 or other transport streams, descrambler circuitry for descrambling streams, and other circuitry.

The resulting streams are then forwarded to the data storage 512 for recording thereon. The data storage 512, under the direction of the control circuitry 518, provides the DVR functionality for the audio/video content receiver 512, as well as provides the memory by which the user may employ trick mode playback. The control circuitry 518, described more fully below, may condition or alter the streams received from the receiver circuit 510 before causing those streams to be stored in the data storage 512. For example, the audio/video streams may be separated from their associated index streams, processed, and stored separately on the data storage 512. The data storage 512 may be include any type of data storage medium, including solid state memory, such as static and/or dynamic random access memory (RAM) or flash memory; and direct access memory, such as magnetic and optical disk drives.

The output interface 518 is configured to decode and/or convert the audio/video streams stored in the data storage 512 and deliver them, or portions thereof, to an output device 550, such as a television, video monitor, audio/video receiver, and so on, in a format usable by the device 550 for presentation to the user or subscriber. For example, the video portion of the audio/video streams may be delivered by way of a modulated video cable connection, a composite or component video RCA-style (Radio Corporation of America) connection, and a Digital Video Interface (DVI) or High-Definition Multimedia Interface (HDMI) connection. The audio portion may be transported over a monaural or stereo audio RCA-style connection, or over an HDMI connection. Other audio/video formats and related connections may be employed in other embodiments.

The user interface 516 provides means by which a user may issue the commands 314 to control the operation of the audio/video content receiver 305, including the playback of the audio/video streams stored in the data storage 512, such as normal-speed playback and trick mode playback. As to the trick modes, the user interface 516 may provide a number of different speeds of playback in both the forward and reverse directions, such as 4× (i.e., four times normal playback speed), 15×, 60×, and 300×, although other speeds may be implemented. The user interface 516 allows control of other trick modes, such as pause, forward or reverse slow-motion playback, forward or reverse frame-by-frame playback, and skip forward or reverse, in like fashion.

The user interface 516 may provide either or both of a control panel connection located directly on a surface of the receiver 506, and a remote control interface. The remote control interface may receive commands from a remote control device 552 by way of commands transmitted over a radio frequency (RF) or infrared (IR) frequency band. Different communication methods, such as those employing optical or acoustic transmission of remote commands, may be used in other implementations.

The control circuitry 512 is configured to control and interact with the receiver circuit 510, the data storage 512, the output interface 514, and the user interface 516 according to the commands and other input received by way of the user interface 516. With respect to audio/video playback, the control circuitry 518 processes the stored index streams in conjunction with their associated audio/video streams to locate "access point" frames in the audio/video stream for performing the trick modes that do not require playback of every video frame in a section of the audio/video stream. A more detailed discussion regarding this process is provided below in conjunction with FIGS. 6-9.

The control circuitry 518 may include one or more processors, such as a microprocessor, microcontroller, or digital signal processor (DSP), configured to execute instructions directing the processor to perform the functions discussed in greater detail below. The control circuitry 518 may also include memory or data storage adapted to contain such instructions. In another implementation, the control circuitry 518 may be strictly hardware-based logic, or may include a combination of hardware, firmware, and/or software elements.

Figure 6:
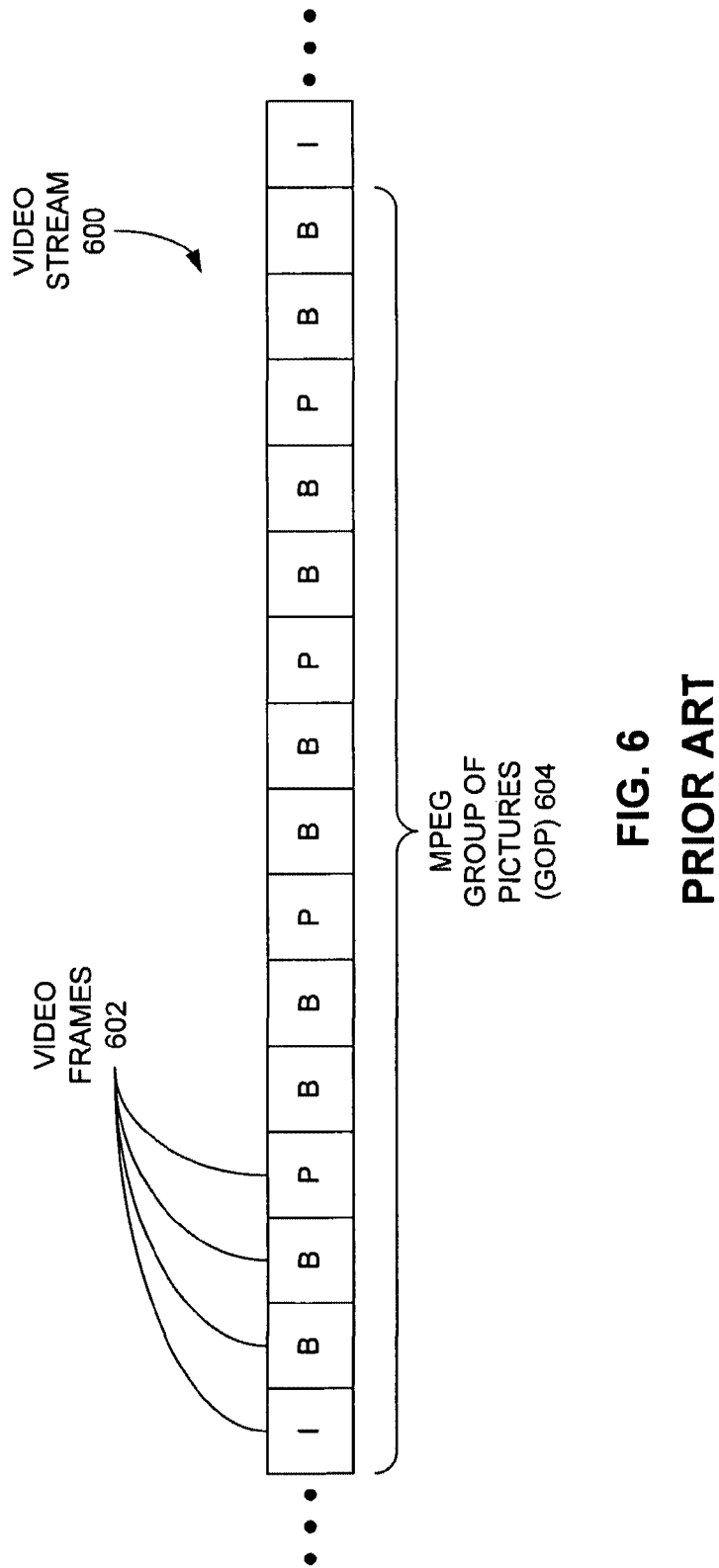
FIG. 6 is a graphical representation of an example video stream employed in an embodiment of the invention.

To preface the explanation of the indexing process provided below, an example of a portion of an MPEG-2 or MPEG-4 video stream 600 is illustrated in FIG. 6. The video stream 600 includes a series of compressed video frames 602. Each intra-coded frame ("I-frame", denoted by an "I" in FIG. 6) contains all of the information required to produce its own frame for presentation on the output device 550. Oppositely, predictive-coded frames ("P-frames", indicated by a "P" in FIG. 6) and bidirectionally-predictive-coded frames ("B-frames", signified by a "B" in FIG. 6) (collectively, non-intra-coded frames) depend on information contained in adjacent frames in addition to its own data in order to be reconstructed for presentation to the user. More specifically, P-frames rely on data from the most recent I-frame or P-frame, while B-frames depend on data from the most recent or immediately following I-frame or P-frame to be reconstructed. As a result, to begin decompressing and decoding video at a point within the video stream 600, the process typically begins at an I-frame, as I-frames are the only frames not dependent upon a nearby frame for reconstruction, and thus may serve as initial access points for video playback within the video stream 600.

Given the importance of the I-frames as access points, the location of the I-frames within the video stream 600 are indexed in an index stream generated in the audio/video content transmitter 302. In other embodiments, P-frames and/or B-frames of the video stream 600 may also be indexed to provide greater access to various points within the video stream 600.

Typically, P-frames and B-frames provided greater compression than I-frames due to their dependence on other video frames, so they generally outnumber I-frames by a significant margin. However, I-frames are periodically employed to allow for playback access points throughout the video stream 600. As a result, the video stream 600 typically includes an I-frame followed by multiple P-frames and B-frames, in a repetitive fashion, as illustrated in FIG. 6. Each set of frames beginning with an I-frame is denoted a "group-of-pictures" (GOP) 604. Depending on the particular strategy used, the number of frames in each GOP 604 may be fixed or variable. As each GOP 604 begins with and includes only a single I-frame, the amount of data in each GOP 604, as well as related information, may be recorded in the index stream to acquire a subsequent or previous I-frame based on a known I-frame in the video stream 600 during trick mode operation.

As mentioned above, the audio/video content receiver 304 separates and stores various audio/video streams and associated index streams from the transmitted transport stream 310 for recording on the data storage 512, typically as files. For example, presuming the use of MPEG-TS packets for the transmitted transport stream 310, a packet identifier (PID) provided in a header area of each TS packet signifies the type of data held in each packet. One type of such data is a Program Map Table (PMT), which is associated with a particular video program or service. The PMT, in turn, indicates which PIDs of the transmitted transport stream 310 correspond with the video stream for that service, as well as the one or more audio streams, the index stream, and other data associated with that video stream. The video stream, the audio streams, and any separate metadata streams are each referred to as a packetized elementary stream (PES). Using the PMTs and associated PIDs, the audio/video content receiver 304 may separate at least some of the incoming MPEG-TS packets into their appropriate PESes, and stores at least some of those streams as files on the data storage 512.

Figure 7:
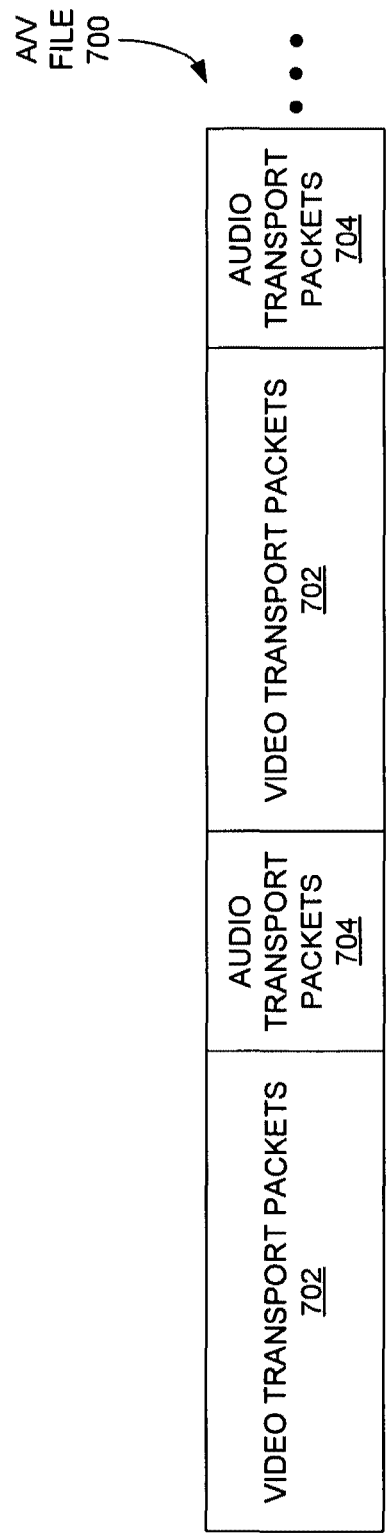
FIG. 7 is a graphical representation of an example audio/video file employed in an embodiment of the invention.

FIG. 7 illustrates an audio/video file 700, which includes video transport packets 702 and associated audio transport packets 704 for a particular program or service as received at the audio/video content receiver 304. In other embodiments, other metadata may be stored in the audio/video file 700. In another implementation, the audio transport packets 704 may be stored in a separate file. The video transport packets 702 include the I-frame, P-frame, and B-frame data discussed above in connection with FIG. 6. Typically, fewer audio transport packets 704 are required, and are interspersed among the video transport packets 702 so that their location within the file is proximate to the video transport packets 702 with which they are to be presented to the user by way of the output device 550. Given the variable length of the various frames stored in the packets 702, as well as the existence of the audio transport packets 704 in the file 700, locating the I-frames within the file 700 would be time-consuming without the associated indexing information provided by the audio/video content transmitter 302.

Figure 8A:
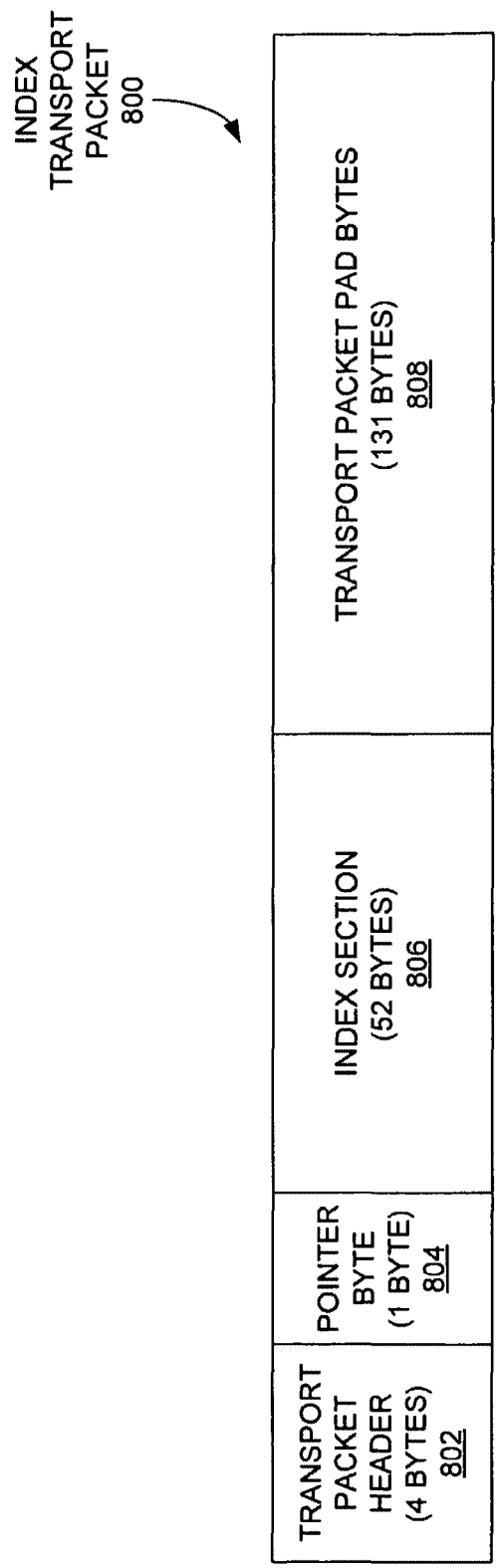
FIG. 8A is a graphical representation of an index transport packet according to an embodiment of the invention.

FIG. 8A graphically illustrates an index transport packet 800 provided within the transmitted transport stream 310 of FIG. 3 according to one embodiment. Such packets 800 appear sparingly within the transport stream 310, as the amount of data required to sufficiently index an associated audio/video file 700 is much less than that of the audio/video file 700 itself. Also, each index transport packet 800 is placed in the transport stream 310 near the corresponding audio/video stream data in some implementations to minimize latency between the two.

In FIG. 8A, the index transport packet 800 begins with a transport packet header 802 of four bytes, a pointer byte 804, an index section 806 of 52 bytes, and transport packet pad bytes 808 (such as all bytes of FF in hexadecimal notation). The packet header 802 includes a PID indicating that the packet 802 is an index packet. The pointer byte 804 may be employed as a pointer to other data, but may also be reserved or not used in other implementations. The index section 806 includes the index information and related data, as shown more specifically in FIG. 8B. The pad bytes 808 fill out the remainder of the packet 800 so that only a single index is stored within the packet 800, thus allowing each index to be placed close to its associated audio/video data in the transmitted transport stream 310. In the specific embodiment of FIG. 8A, the index transport packet 800 is 188 bytes in length to match the length of each of the video transport packets 702 and the audio transport packets 704 of the transmitted transport stream 310.

Figure 8B:
FIG. 8B is a graphical representation of an index section within the index metadata transport packet of FIG. 8A according to an embodiment of the invention.

FIG. 8B provides a more detailed representation of the index section 806 of the index transport packet 800 in one implementation. Many of the fields shown therein align with corresponding fields of MPEG sections provided in the video transport packets 702 and audio transport packets 702 to engender processing compatibility of the index sections 806 with audio sections, video sections, and other metadata sections. The index section 806 begins with a one-byte table ID 810, which in one embodiment is set to EE in hexadecimal notation to distinguish the index section from other types of sections. In one implementation, the one-bit section syntax indicator 812 may be set to one, while the one-bit private indicator 814 may be set to either zero or one. The two-bit reserved areas 816, 824 may be set to 11 in binary notation. The twelve-bit section length field 818, 820 stores the value of 49 (i.e., 31 in hexadecimal notation). The two-byte table ID extension 822 may be set to any value. Further, the five-bit version number 826 may be set to zero, while the single-bit current/next indicator 828 may hold a value of one. The one-byte section number field 830 and the one-byte last section number field 832 may both contain a zero value. The index 834, which includes all of the relevant index information for a particular video frame of the audio/video data file 700, is forty bytes in length in this particular implementation, and is described in greater detail with respect to FIG. 8C. The 32-bit cyclic redundancy check (CRC) field 836 provides error detection capability of the entire index section 806, thus allowing the audio/video content receiver 304 to determine if the received index information has been corrupted during transmission from the audio/video content transmitter 302. While specific example values for most of these fields 810-836 are noted above, the fields 810-836 may include different while remaining with in the scope of the invention.

Figure 8C:
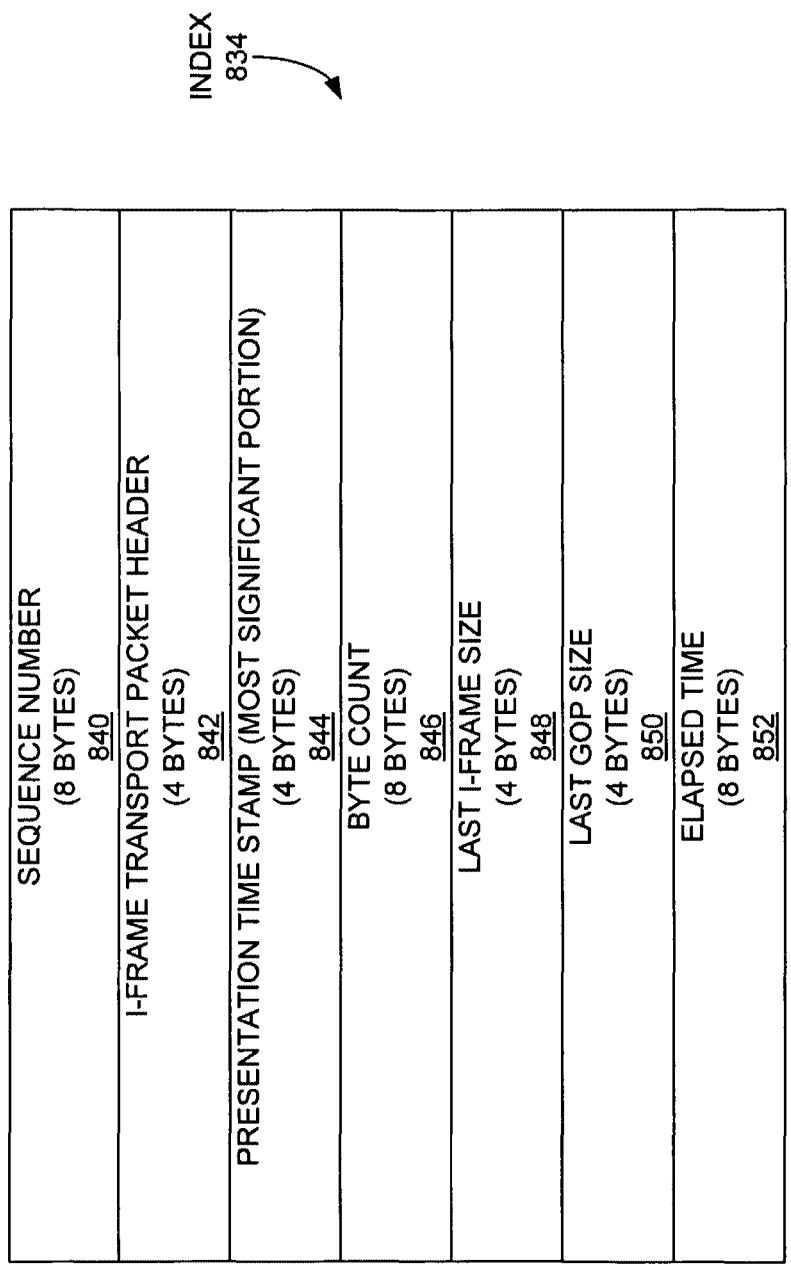
FIG. 8C is a graphical representation of an index within the index section of FIG. 8B according to an embodiment of the invention.

FIG. 8C presents a more detailed view of the index area 834 of the index section 806 shown in FIG. 8B according to one example of the invention. The index 834 includes an eight-byte sequence number 840, a four-byte I-frame transport packet header 842, a four-byte presentation time stamp (PTS) field 844, an eight-byte byte count 846, a four-byte last I-frame size field 848, a four-byte last GOP size field 850, and an eight-byte elapsed time value 852, for a total of forty bytes. Each of these fields may aid in locating the particular I-frame associated with the index 834. However, other or different fields may be utilized in the index 834 in other implementations to facilitate the same functionality.

The sequence number 840 indicates the order in which the indexes 834 are generated for a service. In one example, the first index 834 generated for a service may have a sequence number 840 of zero or one, with each index 834 for the same service having a sequence number 840 one greater than the previous sequence number 840. The control circuitry 518 of the audio/video content receiver 304 may then use the sequence numbers 840 to determine whether any of the indexes 834 received in the transport stream 310 are missing.

The I-frame transport packet header 842 is a copy of the header for the video transport packet 702 that contains the beginning of the I-frame associated with this index 834. As such, the I-frame transport packet header 842 may be compared against the header of the video transport packet 702 containing the start of the associated I-frame as verification that the association between the I-frame and the index 834 is proper.

The byte count 846 holds a running count of the number of audio and video bytes for the audio/video service in question at the point the I-frame associated with the index 834 is generated. In one implementation, the byte count 846 is reset to zero whenever the MPEG encoder employed to generate the video stream 600 is reset. The byte count 846 may facilitate finding the video transport packet 702 data associated with this index, as the difference in byte count 846 between two consecutive indexes 834 should be identical or similar to the distance in bytes between their associated I-frames in the audio/video file 700.

The PTS 844 represents a portion of the PTS stored in a metadata field of at least one of the video transport packets 702 containing the I-frame associated with the index 834. The PTS of the transport packet 702 indicates the time by which the associated video frame is to be decoded and presented for display to the user. In the particular example of FIG. 8C, the PTS 844 holds the most significant 32 bits of the PTS stored with the I-frame. The PTS field 844 of the index 834 thus provides the control circuitry 518 of the audio/video content receiver 304 with a way of initially matching the index 834 with its I-frame packet 702, thus providing initial synchronization between the indexes 834 and the audio/video file 700 located in the data storage 512.

The last I-frame size 848 is the size in bytes of the transport packets 702, 704 of the audio/video file 700 that span the video I-frame immediately prior to the I-frame associated with the index 834, including any audio transport packets 704 interspersed throughout. As each transport packet in this specific implementation is 188 bytes, the last I-frame size 848 is a multiple of 188 bytes. The last I-frame size 848 may be useful from the standpoint that the last GOP size 850 (described immediately below) minus the last I-frame size 848 provides the distance in bytes from the end of the last I-frame to the start of the current I-frame associated with the index 834, thus facilitating the transition from one I-frame to the next when presenting the I-frames in a trick mode. Such functionality is useful if the indexes 834 and the audio/video file 700 are synchronized, as discussed above.

The last GOP size 850 is the size in bytes of the transport packets 702, 704 of the audio/video file 700 that span the previous GOP (i.e., group of pictures) immediately prior to the I-frame associated with this index 834, including any audio transport packets 704 interspersed throughout. As with the last I-frame size 848, each transport packet in the present implementation is 188 bytes, so the last GOP size 850 is also a multiple of 188 bytes. The last GOP size 850 facilitates jumping or spanning from the start of the previous I-frame to the start of the current I-frame in the audio/video file 700.

Lastly, the elapsed time field 852 contains the number of milliseconds elapsed since the byte count field 846 equaled zero. In some cases, the elapsed time 852 may provide another way of determining whether any of the video transport packets 702 of the audio/file 700 are missing, thus possibly causing a lack of synchronization or alignment between the audio/video file 700 and the indexes 834.

As discussed above, the audio/video file 700 shown in the embodiment of FIG. 7 includes video transport packets 702 stored in the data storage 512 in chronological order, with corresponding audio transport packets 704 interspersed throughout in one example, although other storage arrangement are also possible as long as the index information for that service reflects those arrangements. Similarly, the index information may be stored in a number of ways in the data storage 512. For example, the entire transport stream for the indexes 834, including each of the index transport packets 800 (depicted in FIG. 8A) for the associated A/V file 700, may be recorded in the data storage 512 as a single file, thus reducing the amount of preprocessing required before storing the indexes 834. In other embodiments, only the index section 806 (shown in FIG. 8B), or only the index 834 (FIG. 8C), of each index transport packet 800 may be stored therein, thus reducing the amount of space consumed by the index information in the data storage 512.

Figure 9:
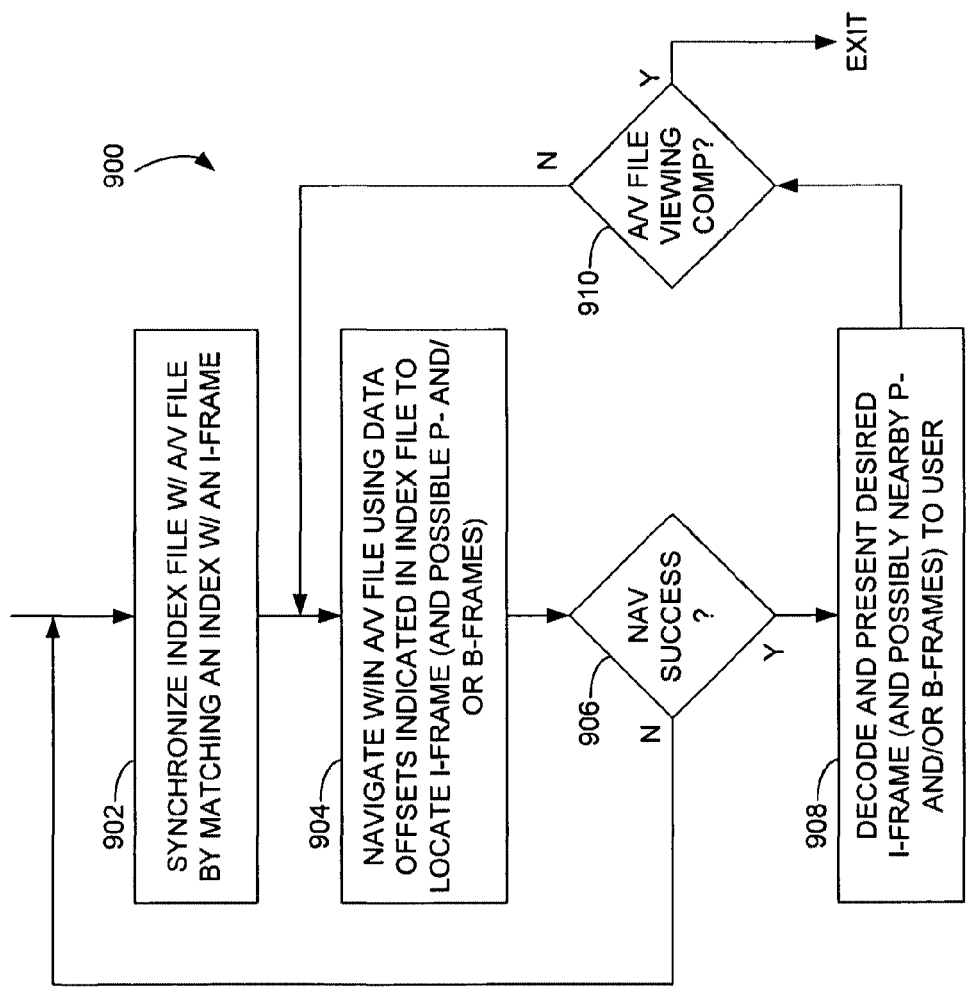
FIG. 9 is a flow diagram of a method according to an embodiment of the invention for processing an audio/video file and associated index file in an audio/video content receiver.

FIG. 9 provides a simplified flow diagram of the operation of the audio/video content receiver 304 regarding the use of trick mode playback. Generally, the receiver 304 processes the indexes 834 to navigate the audio/video file 700 to find specific I-frames which may be read from the data storage 512, which are then decoded and presented to the output device 550 by way of the output interface 514.

To allow the use of the trick modes, the receiver 304, under the direction of its control circuitry 518, synchronizes the index file with the audio/video file 700 by matching an index 834 with its corresponding I-frame in the audio/video file 700 (operation 902). This operation is often initiated upon a user command 314, such as a command to initiate playback of the audio/video file 700. In many cases, the location of the first I-frame of the audio/video file 700 is known with relative certainty, so matching the first I-frame with the first index 834 is a preferred method for synchronizing the audio/video file 700. In one implementation, the PTS field 844 of the index 834 is matched with the PTS of the video transport packet 702 to ensure proper matching. In cases in which the location of the I-frame is more difficult, such as an I-frame associated with an index 834 referencing the middle of the audio/video file 700, the I-frame transport packet header field 842 of the index 834 may be searched within the audio/video file 700 to identify candidate video transport packets 702 of the audio/video file 700 before performing a more detailed search of those packets 702 using the PTS field 844.

Once the match of the index 834 and the appropriate I-frame is made, a marker, such as a bookmark, may be generated to indicate both the exact location of the start of the I-frame and the associated index 834. Such a bookmark may be stored in a separate table or other data structure for access by the control circuitry 518 when a subsequent synchronizing operation 902 is performed.

Once the synchronization or alignment has occurred, the control circuitry 518 may then navigate the audio/video file 700 to perform any of several trick modes for playback under user control 314 (operation 904). For example, for a forward scan, the control circuitry 518 may search ahead any number of I-frames in the audio/video file 700 by accessing the next index 834, using one or more values in the index 834, such as the last GOP size 850, the last I-frame size 848, the byte count 846, or some combination thereof, to find the next I-frame in the file 700. This process may then be repeated a number of times commensurate with the number of I-frames indicated by the user control 314. For example, higher trick mode speeds are likely to require jumps involving more I-frames being skipped. Other data within the various indexes 834, such as the byte count 846, the elapsed time 852, the PTS 844, or other information, may also be employed to determine how many I-frames should be skipped for a particular trick mode. The control circuitry 518 may also utilize this same basic process to perform reverse-direction trick modes as well. As with the synchronization operation 902, the control circuitry 518 may bookmark I-frames found during navigation of the audio/video file 700 for later use. In other implementations, other types of frames, such as P-frames and/or B-frames, may be indexed and employed for navigation as discussed above.

If the navigation was not successful (operation 906), possibly as a result of one or more missing indexes 834 or transport packets 702, 704, the control circuitry 518 may attempt to match another index 834 with its corresponding I-frame in the audio/video file 700 to again attain synchronization (operation 902). In some implementations, bookmarks may be employed to mark off areas of the audio/video file 700 or associated index information to prevent a subsequent occurrence of the failed navigation. In some trick modes, other frames (indexed or not) in the vicinity of the I-frame or other indexed frame may also be decoded and presented to the user. For example, in 4× fast-forward mode, both I-frames and nearby P-frames may be displayed. In forward slow-motion mode, I-frames, P-frames, and B-frames may all be decoded and presented. Variations for other types of trick modes may also be employed in other embodiments.

Once control circuitry 518 has successfully navigated to the desired I-frame in the audio/video file 700, the control circuitry 518 may read and decode the I-frame and present the I-frame to the output device 550 by way of the output interface 514 (operation 908). The control circuitry 518 may also control how long (i.e., the number of frame times) that the I-frame is presented to the user. This amount of time may vary depending on the speed of the trick mode involved, with faster trick modes possibly involving longer presentation times due to their more disjointed appearance to the user.

At any point in the process, the user may designate an end to the current trick mode, such as by pressing a stop, play, pause, or channel change button, or by initiating some other command by way of the remote control device 552 (operation 910). As a result, the control circuitry 518 may stop the processing of the index information to allow standard forward playback mode, static display of an I-frame in pause mode, and other display operations. In the case the user merely alters the speed or direction of the desired high-speed trick mode, the control circuitry 518 may then continue the method 900 using newer parameters commensurate with the new mode.

At least some embodiments as described herein for generating index information in a video content transmitter, and using that information in a video content receiver, result in more processing bandwidth in the receiver being available to perform trick modes and other functions since the receiver need not generate the index information. This advantage is experienced in all of the receivers associated with a video content communication system, such as the thousands or millions of receivers associated with satellite or cable television broadcast networks. Instead, relatively few processing systems in direct control of the video service provider need provide the processing power required to generate the index information. Further, the communication bandwidth needed to transmit the index transport packets from the content transmitter to the content receiver is small in comparison to the associated audio and video packets of the provided service.

While several embodiments of the invention have been discussed herein, other implementations encompassed by the scope of the invention are possible. For example, while various embodiments have been described primarily within the context of satellite and cable television broadcast networks, other communication networks not strictly involving the distribution of audio/video programming, such as the Internet and other wide-area networks (WANs), local-area networks (LANs), wireless communication networks, and the like, may benefit from application of the various concepts presented herein. Further, while the various implementations described herein make extensive use of the MPEG audio/video format standards, other audio/video formats employing data compression techniques may also be utilized in the embodiments discussed above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method to use indexing information and video content, the method comprising:
    receiving a stream of video transport packets, the stream of video transport packets including a plurality of intra-coded frames (I-frame) of video data;
    receiving a stream of indexing data associated with the stream of video transport packets, the stream of indexing data including a set of index frames wherein each index frame of the set of index frames corresponds to at least one I-frame of the plurality of I-frames;
    storing the video transport packets and indexing data in a memory;
    performing a two-stage search to locate a user-directed I-frame of the plurality of I-frames, the two-stage search including:
        retrieving a selected index frame of the set of index frames from the memory;
        parsing the selected index frame to retrieve a selected I-frame transport packet header and a selected presentation time stamp;
        searching transport packet headers of packets in the stream of video transport packets by comparing at least some bits of each searched transport packet header with corresponding bits of the selected I-frame transport packet header;
        identifying a set of candidate video transport packets by matching at least some bits of each searched transport packet header with corresponding bits of the selected I-frame transport packet header;
        searching the set of candidate video transport packets to identify the user-directed I-frame, the user-directed I-frame having an I-frame time stamp matching the selected presentation time stamp.

2. The method of claim 1 wherein the user-directed I-frame is chosen based on a user input request for an altered speed forward scan or reverse scan trick mode.

3. The method of claim 1, comprising:
    storing a bookmark in the memory, the bookmark corresponding to the user-directed selected I-frame;
    retrieving the bookmark from the memory; and
    retrieving the user-directed I-frame based on the bookmark.

4. The method of claim 1, comprising:
    receiving a stream of audio transport packets, the stream of audio transport packets, the stream of video transport packets, and the stream of indexing data included in a single transport stream.

5. The method of claim 4 wherein searching transport packet headers of packets in the stream of video transport packets begins by basing a first packet to search on a position of the selected index frame in the single transport stream.

6. The method of claim 1 wherein the single transport stream is received from a satellite television headend transmitter or a cable television headend transmitter.

7. The method of claim 1 wherein each index frame and each video transport packet has a same number of bits.

8. The method of claim 1 wherein the stream of video transport packets and the stream of indexing data are included within a transport data stream and the stream of video transport packets and the stream of indexing data are packetized elementary streams of the transport data stream.

9. A non-transitory computer-readable storage medium having encoded thereon instructions to direct control circuitry to perform acts, comprising:
    receiving a user-input associated with a trick mode;
    retrieving packets of a transport data stream from a memory, the transport data stream including a sequence of video transport packets, a sequence of audio transport packets, and a sequence of indexing packets;
    locating, with a two-stage search, a first trick-mode I-frame in the sequence of video transport packets, the first I-frame based on the user-input, the two-stage search including;
    executing a first stage of the two-stage search by:
        retrieving a selected index frame packet from the sequence of indexing packets, the index frame packet based on the user-input;
        parsing transport packet headers of the sequence of video transport packets and comparing at least some bits of each transport packet header with corresponding bits of an I-frame transport packet header in the selected index frame packet;
        identifying a video transport packet as a candidate video transport packet when at least some bits of each parsed transport packet header match corresponding bits of the selected I-frame transport packet header;
    executing a second stage of the two-stage search by:
        parsing the candidate video transport packets and comparing an I-frame time stamp in each parsed candidate video transport packet with a presentation time stamp in the selected index frame packet; and
        identifying the first trick-mode I-frame in the sequence of video transport packets when the presentation time stamp in the selected index frame packet matches the time stamp in a candidate video transport packet.

10. The computer-readable storage medium having encoded thereon instructions to direct control circuitry to perform acts of claim 9, comprising:
    decoding the first trick mode I-frame to retrieve presentable video information;
    communicating the presentable video information to a display device; and locating a second trick-mode I-frame in the sequence of video transport packets, the second I-frame being associated with an second index frame packet, the second index frame packet have a sequence number adjacent to a sequence number of the selected index frame packet.

11. The computer-readable storage medium of claim 9 wherein a second selected index frame packet has a sequence number higher than the sequence number of the selected index frame packet if the trick mode is a fast forward play trick mode, and the second selected index frame packet has a sequence number lower than the sequence number of the selected index frame packet if the trick mode is a reverse play trick mode.

12. The computer-readable storage medium of claim 9 wherein a missing packet is identified if a second selected index frame packet sequence number is not a next sequence number or a previous sequence number in a series of sequence numbers.

13. The computer-readable storage medium of claim 9 wherein a missing packet is identified if a presentation time stamp in a second selected index frame packet is not different from the presentation time stamp of the selected index frame packet by a predetermined amount.

14. The computer-readable storage medium of claim 9 wherein each index of the sequence of indexing packets represents a data offset of an associated video frame of the sequence of video transport packets.

15. A video content receiver, comprising:
a receiver circuit to receive single transport stream formed with a stream of video transport packets and a stream of indexing packets, the stream of video transport packets including a plurality of intra-coded frames (I-frame) of video data, the stream of indexing packets associated with the stream of video transport packets, the stream of indexing packets including a set of index frames wherein each index frame of the set of index frames corresponds to at least one I-frame of the plurality of I-frames;
a data storage circuit to store the video transport packets and the indexing packets;
a user interface to receive a user-directed trick mode signal; and
a control circuit configured to perform, based on the trick mode signal, a two-stage search to locate a user-directed I-frame of the plurality of I-frames, the two-stage search including:
retrieving a selected index frame of the set of index frames from the data storage circuit;
parsing the selected index frame to retrieve a selected I-frame transport packet header and a selected presentation time stamp;
searching transport packet headers of packets in the stream of video transport packets by comparing at least some bits of each searched transport packet header with corresponding bits of the selected I-frame transport packet header;
identifying a set of candidate video transport packets by matching at least some bits of each searched transport packet header with corresponding bits of the selected I-frame transport packet header;
searching the set of candidate video transport packets to identify the user-directed I-frame, the user-directed I-frame having an I-frame time stamp matching the selected presentation time stamp.

16. The video content receiver of claim 15, comprising:
an output interface circuit to communicate video data decoded by the control circuit to an output device.

17. The video content receiver of claim 16 wherein each index frame of the stream of indexing packets includes a data offset indicating an amount of data embedded in a corresponding video transport packet.

18. The video content receiver of claim 16 wherein the user-directed I-frame is chosen based on the user-directed trick mode signal being a request for an altered speed forward scan or reverse scan trick mode.

19. The video content receiver of claim 16 wherein a bookmark corresponding to the user-directed selected I-frame is stored in the data-storage circuit, and the control circuit is configured to retrieve the bookmark from the memory and retrieve the user-directed I-frame from the data-storage circuit based on the bookmark.

20. The video content receiver of claim 16 wherein the control circuit is configured to begin searching transport packet headers of packets in the stream of video transport packets based on a relative position of the selected index frame in the single transport stream.

* * * * *